United States Patent

Suzuki

[11] 3,878,508
[45] Apr. 15, 1975

[54] COMBINED TURN SIGNAL AND HAZARD WARNING SIGNALING SYSTEM FOR A VEHICLE

[75] Inventor: Masaru Suzuki, Chiryu, Japan

[73] Assignee: Kabushiki-Kaisha Tokai Rika Denki Seisakusho, Nishi-Kasugai-gun, Aichi-ken, Japan

[22] Filed: Dec. 20, 1972

[21] Appl. No.: 316,881

Related U.S. Application Data

[63] Continuation of Ser. No. 132,399, April 8, 1971, abandoned.

[52] U.S. Cl.................. 340/81 R; 340/56; 340/69
[51] Int. Cl................................................ B60q 1/50
[58] Field of Search............ 340/81 F, 81 R, 54, 56, 340/69, 72, 66

[56] References Cited
UNITED STATES PATENTS

| | | | |
|---|---|---|---|
| 2,106,643 | 1/1938 | Mellen et al. | 340/54 |
| 2,308,097 | 1/1943 | Murray | 340/56 |
| 2,722,674 | 11/1955 | Leichsenring | 340/72 |
| 3,002,127 | 9/1961 | Grontkowski | 340/81 R X |
| 3,185,961 | 5/1965 | Du Rocher | 340/81 F |
| 3,325,784 | 6/1967 | Erdelitsch et al. | 340/69 X |
| 3,462,733 | 8/1969 | Boya et al. | 340/54 |
| 3,487,358 | 12/1969 | Upukata et al. | 340/81 F |
| 3,662,336 | 5/1972 | Suzuki | 340/81 F |
| R26,841 | 3/1970 | Brown | 340/81 F |

Primary Examiner—John W. Caldwell
Assistant Examiner—Marshall M. Curtis
Attorney, Agent, or Firm—Shlesinger, Fitzsimmons & Shlesinger

[57] ABSTRACT

An automatic cancelling system for a hazard warning signaling device for a vehicle, in which an electric circuit for actuating the hazard warning signaling device to effect simultaneous flashing operation of both the left-hand and right-hand direction signaling lamps is closed, only when the vehicle is parked, by means of a switch which is connected in the circuit in series and closed upon the parking of the vehicle.

3 Claims, 2 Drawing Figures

COMBINED TURN SIGNAL AND HAZARD WARNING SIGNALING SYSTEM FOR A VEHICLE

This application is a continuation of my U.S. application Ser. No. 132,399, filed Apr. 8, 1971, and now abandoned.

This invention relates to an automatic cancelling system for a hazard warning signaling device for a vehicle. There have been proposed various kinds of apparatuses which can operate simultaneously left-hand and right-hand turn signaling devices for enabling the direction signaling apparatuses of parked or disabled vehicles to function as hazard warning devices to the drivers of approaching vehicles. In an instance where a driver actuates the vehicle's hazard warning device to indicate hazardous conditions of his vehicle and fails to cancel the hazard warning device before starting the vehicle, the vehicle may run with all the turning signaling devices simultaneously operating. The simultaneous operation of a vehicle's direction signals under such circumstance could result in traffic confusion and even a traffic accident, sometimes.

Hence, it is preferable to have front and rear lamps at both the left-hand and right-hand sides of a vehicle operable to flash simultaneously only when the vehicle is parked, by providing a hazard warning signalling device with switch means which is closed only when the vehicle is not driven.

A principal object of the present invention is, therefore, to provide an automatic cancelling system for a hazard warning signalling device which effects the simultaneous flashing of both the left-hand and right-hand turn signals, to prevent failure of a driver to cancel the device before starting a vehicle.

In the accompanying drawing in which preferred embodiments of the present invention are illustrated:

Figure 1:
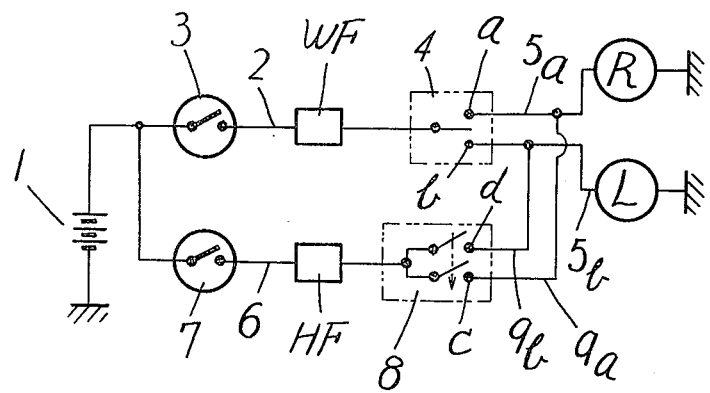
FIG. 1 is a wiring diagram of the present invention cancelling system.

Firstly, with reference to FIG. 1 whicch illustrates an embodiment of the present invention, a direction signal actuating circuit 2 comprises a key-operated ignition switch 3, a flasher WF and a direction signal actuating switch 4, all of which are connected to an electric source 1 in series. To a stationary contact a of the switch 4 there is connected through a wire 5a a lamp R at the right side of a vehicle, and to another stationary contact b of said switch 4 there is connected through a wire 5b a lamp L at the left side of the vehicle, so that either the lamp R or the lamp L can selectively be flashed by the operation of the switch 4 when the ignition switch 3 is closed.

A hazard warning signaling circuit 6, which is connected at one of its ends to the electric source 1, comprises a switch 7, which opens in response to the running of a vehicle, a flasher HF, and a hazard warning signaling switch 8, all of which are connected in series. A single throw double pole switch 8 is provided with two stationary contacts d and c which are simultaneously connected to the electric source 1 when this switch is actuated. A wire 9a connected at one of its ends to the stationary contact c of the switch 8 is connected at its other end to the wire 5a, while a wire 9b connected at one of its ends to the stationary contact d is connected to the lamp L through the wire 5b.

Figure 2:
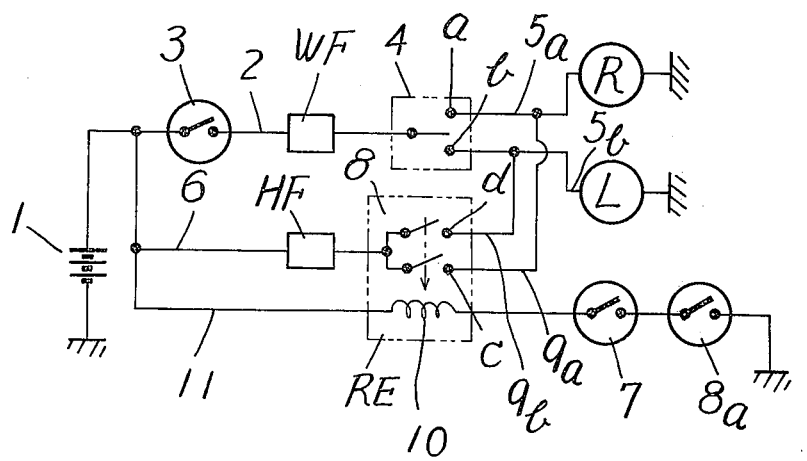
FIG. 2 is a wiring diagram similar to FIG. 1, showing another embodiment of the present invention cancelling system.

Secondly, with reference to FIG. 2 which illustrates another embodiment of the present invention wherein a hazard warning signaling switch 8 is actuated by means of a coil 10 of a relay RE, and in which the parts corresponding to those of the embodiment explained above with reference to FIG. 1 are indicated by same numerals and letters; a circuit 11, which is connected at one of its ends to the electric source 1 for selectively energizing the relay RE provided with the coil 10, comprises said coil 10, a switch 7 which actuates in response to the running of a vehicle, and a manually operable switch 8a such as of the push-in and pull-out type, all of which are connected in series.

The switch 7 described above with reference to the first and second embodiments and respectively illustrated in FIGS. 1 and 2 could be any one of conventional switches of the kind which is held open when a vehicle is running, and is kept closed only when the vehicle is motionless or parked, by means, for example, which detects the running of the vehicle through the rotary movement of a propeller shaft of the vehicle.

In the present automatic cancelling system for a hazard warning signalling device having one of the above constructions, as long as the switch 7 is kept closed in response to the parking of a vehicle, both the lamps R and L at its right-hand and left-hand sides could be simultaneously operated, being flashed by the flasher HF, provided that the hazard warning signaling switch 8 is turned on in FIG. 1, or the switch operating means 8a is turned on in FIG. 2, thereby closing the relay circuit 11 and closing the switch 8 by means of energized coil 10. Even when a driver starts a vehicle, having failed to turn off the switch 8 or switch operating means 8a, the switch 7 turns off automatically when the vehicle is moved, thereby preventing flashing of the direction signaling lamps R and L by the hazard warning signaling circuit 6.

What is claimed is:

1. A combined turn signal and hazard warning signaling system for a vehicle comprising
   normally inactive left-hand and right-hand signaling lamps,
   a turning signal circuit having
   a first flasher,
   first switch means for selectively coupling said first flasher in series with either of the two signal lamps to indicate a left-hand or a right-hand turn of the vehicle, when said first flasher is energized, and
   an ignition switch for selectively connecting said first flasher in series with an electric power source to be energized thereby, and
   a separate hazard-warning circuit connectable directly to said power source in parallel with said turning signal circuit and comprising
   a second flasher,
   a single-throw, double-pole switch connected in series with said second flasher and operable selectively to connect both said lamps simultaneously to said second flasher for operation thereby when said second flasher is energized,
   a motion-sensing switch connected directly to said power source and to said second flasher, which closes automatically when the vehicle is parked and opens when the vehicle is in motion, whereby said motion-sensing switch operates to connect said second flasher in circuit with said power source for energization thereby, when the vehicle is parked, to effect flashing of both said lamps simultaneously, and is operative automatically to break the connection of said second flasher and said lamps to said power source when the vehicle is running.

2. A combined turn signal and hazard warning system as claimed in claim 1, wherein
said fourth switch is in series with said power source, said second flasher, and said single-throw, double-pole switch, and
said single-throw, double-pole switch is movable manually between its open and closed positions, respectively.

3. A combined turn signal and hazard warning system as claimed in claim 1, wherein a relay is provided for moving said single-throw, double-pole switch to closed position, and the coil of said relay is in series circuit with said power source, said fourth switch, and a manually operable switch.

* * * * *